United States Patent [19]

Fishbein et al.

[11] 4,078,234
[45] Mar. 7, 1978

[54] CONTINUOUS WAVE CORRELATION RADAR SYSTEM

[75] Inventors: William Fishbein, Elberon; Otto E. Rittenbach, Neptune, both of N.J.

[73] Assignee: The United States of America as represented by the Secretary of the Army, Washington, D.C.

[21] Appl. No.: 687,783

[22] Filed: May 19, 1976

Related U.S. Application Data

[63] Continuation-in-part of Ser. No. 571,811, April 25, 1975, abandoned.

[51] Int. Cl.² ............................................. G01S 9/23
[52] U.S. Cl. ................................. 343/9; 343/17.2 R; 343/17.5
[58] Field of Search ....................... 343/9, 17.2 R, 17.5

[56] References Cited

U.S. PATENT DOCUMENTS

| | | | |
|---|---|---|---|
| 3,337,870 | 8/1967 | Allen et al. | 343/17.5 |
| 3,388,398 | 6/1968 | Kratzer et al. | 343/17.5 |
| 3,568,188 | 3/1971 | Fishbein et al. | 343/17.5 X |
| 3,787,853 | 1/1974 | Brookner | 343/9 X |
| 3,790,938 | 2/1974 | Anderson et al. | 343/17.2 R X |
| 3,801,982 | 4/1974 | Richmond | 343/17.2 R X |

*Primary Examiner*—T.H. Tubbesing
*Attorney, Agent, or Firm*—Nathan Edelberg; Sheldon Kanars; Daniel D. Sharp

[57] ABSTRACT

A CW radar transmitter is simultaneously frequency modulated with a sinusoidal wave and phase-modulated with a pseudorandom binary code. Both the frequency of the FM signal and the bits and bit duration in the binary code can be varied to change the resolution and range of the system.

14 Claims, 10 Drawing Figures

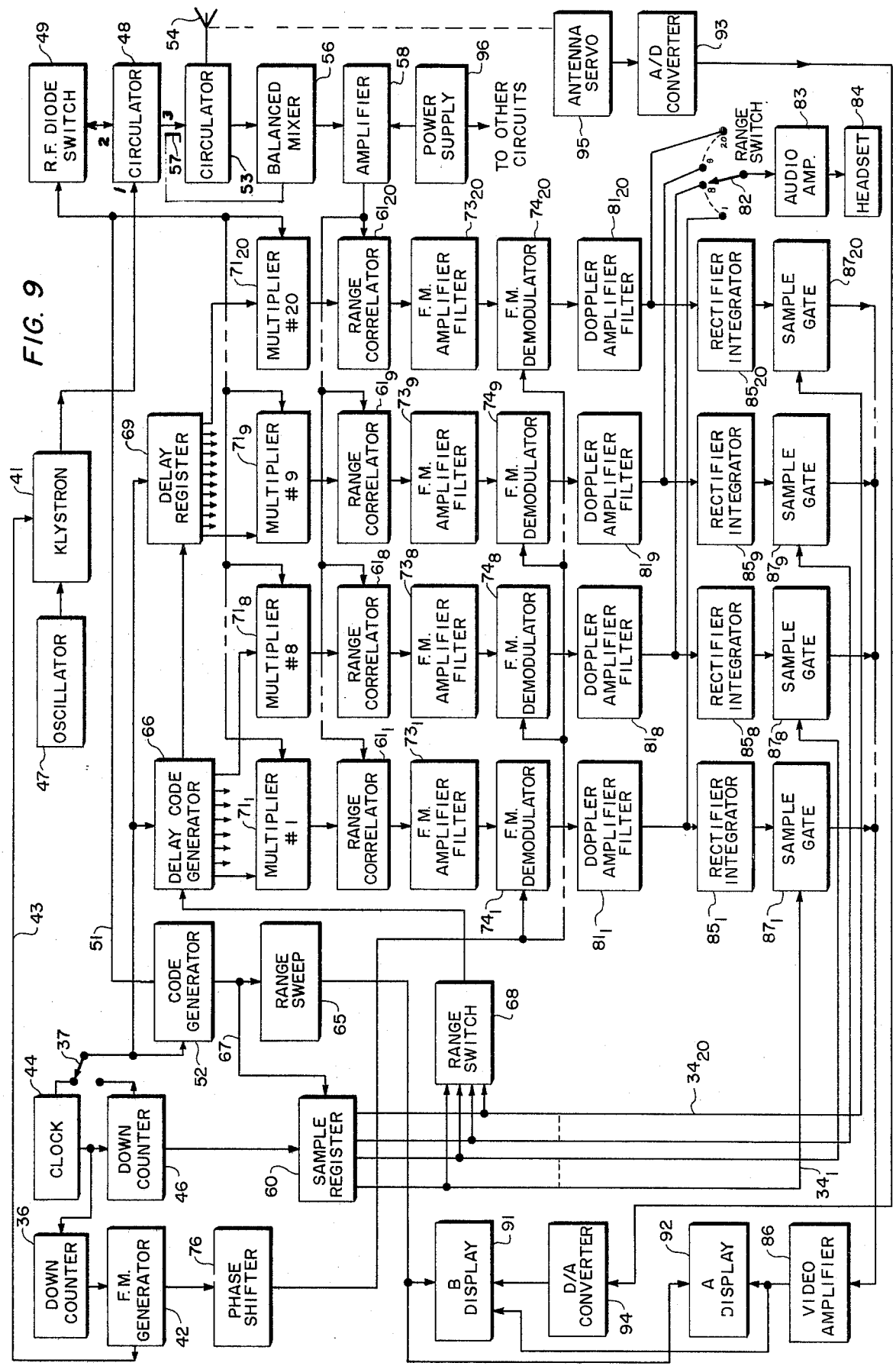

CONTINUOUS WAVE CORRELATION RADAR SYSTEM

The invention described herein may be manufactured and used by or for the Government for governmental purposes without the payment of any royalties thereon or therefor.

This application is a continuation-in-part of copending patent application Ser. No. 571,811 of William Fishbein and Otto E. Rittenbach, entitled Continuous Wave Correlation Radar System, filed Apr. 25, 1975, now abandoned.

BACKGROUND OF THE INVENTION (a) Field of the Invention

Broadly speaking, this invention relates to continuous wave radar systems. More particularly, in a preferred embodiment, this invention relates to a continuous wave radar system in which the CW signal is simultaneously sinusoidally frequency-modulated and pseudo-random phase-modulated.

(b) Discussion of the Prior Art

As is well known, a pulse-modulated radar system is subject to certain inherent limitations, particularly when the Doppler frequency of a moving target is to be ascertained. Continuous wave radar systems overcome these deficiencies but have difficulty in measuring the range of and accurately resolving a target. Also, due to the variation of target echo strength with the fourth power of range, nearby signals can drown out more distant ones.

U.S. Pat. No. 3,396,392, which issued Aug. 6, 1968, and U.S. Pat. No. 3,195,129, which issued on July 13, 1965, both to William Fishbein and Otto Rittenbach, separately solve both of these problems, but in a practical radar system both problems arise simultaneously. A further complication is the interference that occurs between the broadband and narrow-band waveforms as well as the interference that occurs between the target Doppler frequency and the spectral components of the broad and narrow-band signals. All of these problems are compounded when it is desired to use a common transmitting and receiving antenna aperture, for example, in a portable radar system.

SUMMARY OF THE INVENTION

These and other problems have been solved by the instant invention which, in a preferred embodiment, comprises an antenna having a source of continuous wave microwave energy connected thereto. The system further includes means for generating a first, p-bit, pseudo-random binary code and means for phase-modulating the microwave source with the first pseudo-random code. The system also includes means for generating a sinusoidal signal of a first frequency and means for frequency-modulating the microwave source with the first frequency. Also included are means, connected to both the antenna and the microwave source, for deriving from each target echo received by the antenna a video-frequency signal comprising the delayed sinusoidal frequency modulation and target Doppler signal modulated upon a delayed version of the first pseudo-random code. The system also includes means for generating a second, pseudo-random code which corresponds to the first code but which is delayed in time with respect thereto by a predetermined amount, means connected to the means for deriving the video-frequency signal and to the second code generating means, for correlating the delayed version of the first code with the second code. Finally, the system also includes means, connected to the correlating means, for demodulating the output therefrom to, thus, obtain the target Doppler signal and means for rendering the target Doppler signal audible to an operator.

The invention and its mode of operation will be more fully understood from the following detailed description, when taken with the appended drawings in which:

FIG. 9 is a block schematic diagram showing the illustrative embodiment of FIG. 1 in much more detail.

DETAILED DESCRIPTION OF THE INVENTION

Figure 1:
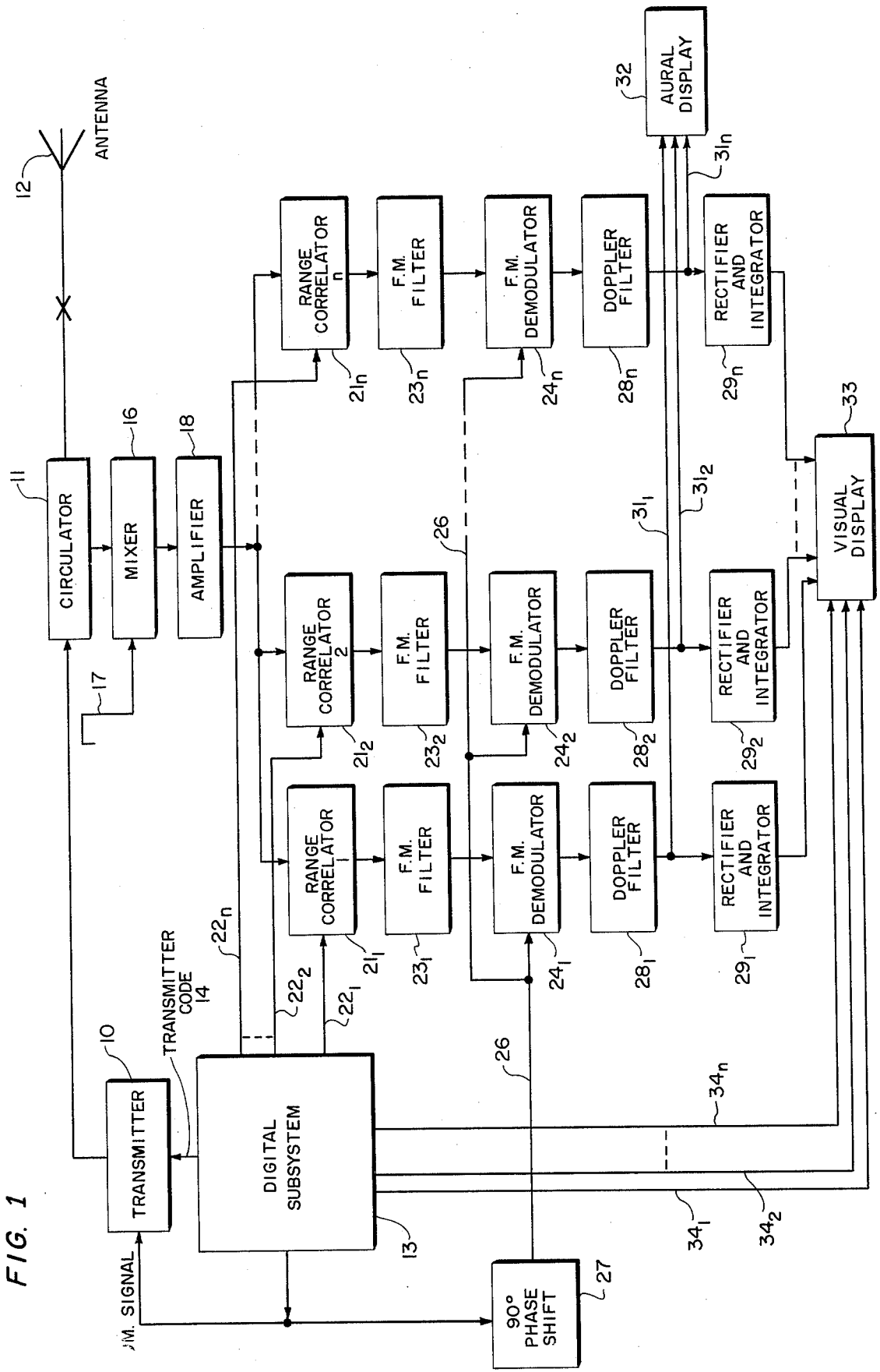
FIG. 1 is a simplified block schematic diagram of an illustrative radar system according to the invention.

FIG. 1 is a simplified block diagram of an illustrative embodiment of the invention. As shown, the output of a continuous wave radar transmitter or source 10 is connected to a circulator 11, thence to a transmit/receive antenna 12. A digital subsystem 13, to be described in more detail later, generates a pseudo-random binary code which is applied to transmitter 10 on lead 14 to phase-modulate the output therefrom. Subsystem 13 also generates a sinusoidal wave which is likewise applied to transmitter 10 to sinusoidally frequency-modulate the output therefrom.

Echoes from all targets illuminated by the transmitter signal are collected by the antenna 12 and fed to a mixer 16, via circulator 11 which, in a well-known manner, provides isolation between the transmitted and received signal. The signal received by antenna 12 comprises an attenuated, delayed replica of the coded, f.m. transmitter signal for each target return upon which are superimposed the target Doppler modulation.

Mixer 16 receives a portion of the output of transmitter 10, via a coupler 17; thus, the output of mixer 16 will comprise a complex video signal which, for each target, contains the initial sinusoidal f.m. signal modulated by the code, the same signal delayed and modulated by the target Doppler. The effect of mixing the received signal with the coded f.m. transmitter signal is to produce a scrambling of the target delay signals as they emerge from the output of mixer 16. In the decoding process to be described, however, the scrambled target information is unscrambled and presented in its proper time sequence.

The output of mixer 16 is connected to a broadband amplifier 18 and the amplifier signal is then connected to a plurality of range correlators $21_1$ to $21_n$. In the illustrative embodiment, twenty such range correlators are employed. Digital subsystem 13 generates $n$ additional pseudo-random codes each having a different delay with respect to the code on lead 14. The delayed codes are respectively connected, via leads $22_1 - 22_n$, to the corresponding range correlators $21_1 - 21_n$. The range correlators perform the function of decoding the target information and placing it in its proper range sequence. Because each range correlator is driven by one of $n$ pseudo-random codes of different delay, in those correlators where the target signal code received by antenna 12 multiplied by the transmitter code matches, code element by code element, the delayed code from subsystem 13, the output of the correlator will be at a maximum and will comprise a signal at the f.m. frequency upon which the Doppler information for the corresponding target is modulated.

In those correlators where the codes do not match, the effective target signal is reduced by $1/p$, where $p$ is the number of bits in the pseudo-random code. The outputs of the $n$ range correlators contain target information from $n$ contiguous range bins or range slots. Timing for the range correlators is maintained by feeding each correlator with a properly delayed code from digital subsystem 13, via leads $22_1 - 22_n$. The proper delay code for a particular correlator is obtained by multiplying the zero range code (which is the same code fed over lead 14 to the transmitter) by the code corresponding to the real time delay of the range bin represented by that correlator. This process, in effect, unscrambles the scrambling that took place in mixer 16.

The output of each correlator 20 is then filtered in a filter 23 at the f.m. frequency and then demodulated in a balanced phase-sensitive demodulator 24 which uses the transmitter f.m. signal as a reference. This reference signal is supplied via lead 26 which includes a delay element 27 which adjusts the phase of the reference signal by 90° relative to the f.m. signal at the transmitter excluding any phase shift contributed by the filter and amplifier. Adjusting the phase of the reference signal for demodulators $24_1 - 24_n$ tends to suppress the output of the demodulator for near-in targets while permitting signals from maximum range targets to pass through practically unattenuated. This greatly reduces the dynamic range requirement of subsequent circuitry which, as shown, comprises a Doppler filter-amplifier 28 and a fullwave rectifier-integrator 29 connected to the output of each demodulator 24. The target suppression obtained by delaying the phase of the reference signal also is beneficial in reducing target residues in unwanted range bins.

The filtered and amplified Doppler signal from each demodulator 24 is applied, via leads $31_1 - 31_n$, to a suitable aural display 32. In the illustrative example, a simple headset and an $n$ position switch enables an operator to monitor $n$ separate range bins.

The rectified and integrated output of each Doppler filter comprises a D.C. signal which is proportional to the target strength in the corresponding range bin. The outputs of rectifiers $29_1 - 29_n$ are sequentially sampled by a visual display device 33 which receives sampling pulses from digital subsystem 13, via leads $34_1 - 34_n$.

Thus, visual display device 33 produces $n$ pulsed outputs which are proportional to the target strength in each range bin. These pulses are sequentially time-multiplexed onto a single line and presented as remanufactured video on a suitable video display.

The range resolution of the correlation radar system disclosed herein is a function of the bit width of the pseudo-random code used. The simultaneous range coverage capability is a function of the bit width times the number of range bins employed in the system. In an experimental system actually built and tested, two range resolutions were used. These consisted of a coarse resolution used for rapid search, and a fine resolution used for accurate ranging. The experimental system employed the same range bins for both resolution modes. In the fine mode, the center of the range segment covered by the 20 range bins was movable. The ability to move the range "window" was accomplished by employing two identical code generators in digital subsystem 13. One code generator, which was fixed in starting phase, supplied the code reference signal to the transmitter. The other code generator, whose starting phase was adjustable by the system range control, provided the delay codes for the range correlators.

The circuitry shown in FIG. 1 can detect only moving targets. In order to detect fixed targets, using the same basic circuitry, transmitter 10 is frequency modulated at 30 cps with a high deviation ratio. This additional f.m. signal, when reflected from a target, produces an output from mixer 16 which contains harmonics which fall throughout the normal Doppler band. Although all targets will produce such returns, fixed targets, being more prevalent and generally larger in relective area than moving targets, will greatly predominate on the display. This operating mode is therefore utilized as a fixed target display.

In addition to variable range resolution and movable range windows, the experimental system also employed a scanning antenna capable of automatic azimuth search at various azimuth rates and coverages. This azimuth scanning, in conjunction with the remanufactured range video, was used to produce a B type visual display which provided an instantaneous azimuth vs range map to the operator. An A type presentation of target strength vs range was also provided.

The properties of the waveforms which are used to advantage in the correlation radar system according to the invention will now be discussed. These properties include the correlations function of pseudo-random codes and the near-in target suppression effects of sinusoidal FM on the CW radar signal. Imperfections in signal processing degrade system performance in various ways. The major contributors to this degradation will also be discussed and their effects on performance outlined.

Since the properties of pseudo-random sequences have been well treated in the literature, only those characteristics which are basic to the operation of the instant invention will be discussed here. The code consists of a binary sequence of 1's and $-1$'s which is generated by an N-stage feedback shift register. The length of the sequence is $2^N - 1$ bits, the bit width being determined by an external clock. There are $(2^{N-1} - 1)$ plus ones and $(2^{N-1})$ minus ones in the total sequence. Thus, if the code were to be integrated over the total code period $T = (2^N - 1) \Delta T$ (where $\Delta T = 1$ bit width) the result would be $- \Delta T$. If the code is multiplied by itself delayed by $n$ bits, the resultant code is simply another shifted version of the original sequence. From the above two properties the correlation function of the sequence can be generated. The correlation process is defined as below.

$$R_u(\tau) = \int_0^T u(t)\, u(t + \tau)\, dt \qquad (1)$$

For $\tau = 0$, and $u(t) = 1$ or $-1$, we have $$R_u(0) = \int_0^T u^2(t)\, dt = T = (2^N - 1)\Delta T \qquad (2)$$

For $\tau = n\,\Delta T$ where $n = 1, 2, 3 \cdots (T/\Delta T - 1)$, we have $$R_u(n\Delta T) = \int_0^T u(t)u(t + n\Delta T)\, dt \qquad (3)$$

but, $u(t)u(t + n\,\Delta T) = (t + n'\,\Delta T)$ where $n' \neq n$. Thus $$R_u(n\Delta T) = \int_0^T u(t + n'\Delta T)\, dt = -\Delta T \qquad (4)$$

Figure 2:
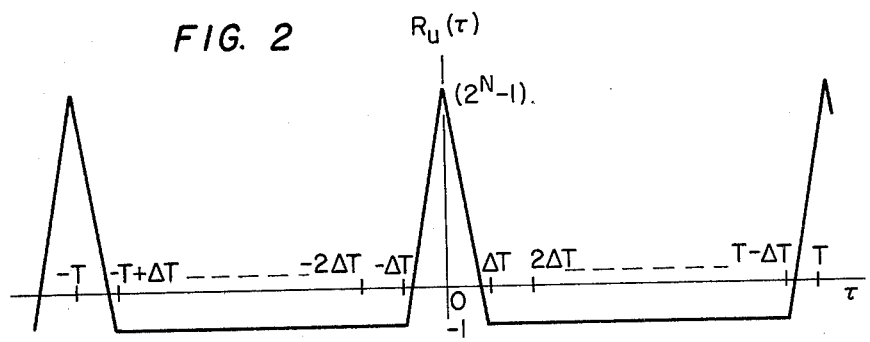
FIG. 2 is a graph showing the correlation function for the pseudo-random code employed in the system of FIG. 1.

The correlation function is seen to have a peak at $n = 0$ of $(2^N - 1)\Delta T$ and a constant residue for $n \neq 0$ of $-\Delta T$. This correlation function is shown in FIG. 2, where $\Delta T$ is normalized to 1. By appropriately phase coding the transmitted signal with such a sequence, and applying appropriate correlation processing in the receiver, excellent range resolution with low residues is achieved with the instant invention.

While the correlation function described above can have a very low residue for large N, a problem exists in that this residue is constant (i.e., does not continually decrease with increasing distance from the correlation peak). Thus, a large target near the radar will have as large a residue in a distant range bin as it does in a nearby adjacent bin. While such a residue might be 40 db down from the correlated bin response, it might be well above the correlated response from a smaller target in a distant bin. In order to suppress the returns from close-in targets, the radar system according to the instant invention employs frequency modulation of the transmitted signal and phase-sensitive, coherent receiver processing.

In FIG. 1 assume that the transmitted signal is sinusoidally frequency modulated at the rate $\omega_m$ with a peak frequency deviation of $\Delta\omega$. The form of the transmitted signal is:

$$e_T(t) = A \sin[\omega_o t + B \sin \omega_m t] \qquad (5)$$

where:

$B = \Delta\omega/\omega_m$ = depth of modulation

The received target echo is given by the expression:

$$e_R(t) = kA \sin[\omega_o t + B \sin \omega_m(t - \tau) + \phi(t)] \qquad (6)$$

where:

$\tau$ = round trip delay time
$\phi(t)$ = target doppler perturbations.

If this received signal is mixed with a portion of the transmitted signal, the resultant output will be $$e_m(t) = kA^2\{J_0(m_f)\cos\phi(t) + 2J_1(m_f)\cos\theta(t)\sin\phi(t) \\ - 2J_2(m_f)\cos 2\theta(t)\cos\phi(t) - 2J_3(m_f)\cos\theta(t) \\ \sin\phi(t) + \text{higher order terms}\} \qquad (7)$$

where:

$$m_f = 2B \sin \frac{\omega_m \tau}{2}$$

$$\theta(t) = \omega_m t - \frac{\omega_m \tau}{2}$$

$J_n = n^{th}$ order Bessel function.

The Bessel functions are seen to be constants, dependent on B, and the round trip delay time. If the target Doppler frequency $\phi'(t)$ is much less than $\omega_m$, this signal can be passed through a narrow band filter centered at $\omega_m$, such as filter 23 in FIG. 1, thus suppressing all but the $J_1$ term. Thus, at the filter output we have:

$$e_1(t) = 2KA^2 J_1\left[2B \sin \frac{\omega_m \tau}{2}\right]\cos\left[\omega_m t - \frac{\omega_m \tau}{2} + \Theta\right]\sin\phi(t) \qquad (8)$$

where $\Theta$ represents the phase shift added by the amplifier and filter. After mixing with $-\sin(\omega_m t + \Theta)$ and passing the output through a Doppler filter, such as filter 28 in FIG. 1, the final signal is of the form:

$$e_d(t) = KA^2\left[J_1\left(2B \sin \frac{\omega_m \tau}{2}\right)\sin\left(\frac{\omega_m \tau}{2}\right)\right]\sin\phi(t) \qquad (9)$$

The term in brackets is the desired suppression term for close-in targets. Since there should be no suppression of targets at the maximum range of interest ($\tau = \tau_{max}$), the suppression term must peak at $\tau_{max}$. This will occur if $\omega_m = \pi/\tau_{max}$ and $B = 0.9$. For these parameters, and $\tau = \tau_{max}$, the first order Bessel function peaks at a value of 0.58 thus introducing a small loss (1.7 db) for the maximum range target. As $\tau$ decreases, the suppression term decreases the target strength rapidly towards zero, thus offsetting the increase in echo power due to the reduced range. The received voltage KA from a target of constant cross-section will increase as $1/\tau^2$ with decreasing range. Thus, we can write:

$$e_d(t) = K\frac{1}{\tau^2} J_1\left[2B \sin \frac{\omega_m \tau}{2}\right]\sin \frac{\omega_m \tau}{2} \sin\phi(t) \qquad (10)$$

Figure 3:
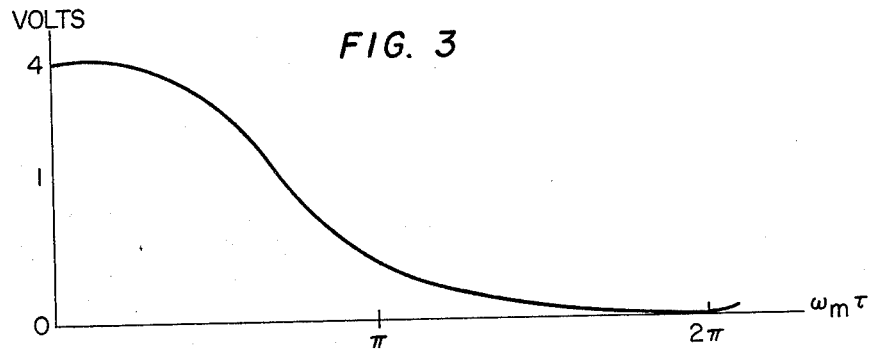
FIG. 3 is a graph showing the variation of the peak Doppler voltage with target range.

The variation of peak Doppler voltage $V_p$ is plotted against $\omega_m \tau$ in FIG. 3. An increase of only about 12 db in peak voltage results from the target moving from maximum range to very close range. This small increase corresponds to an increase in actual received echo power in excess of 80 db.

In the correlation radar system disclosed herein, both pseudo-random phase-coding and sinusoidal frequency modulation are used to achieve range resolution and low residue levels. In combining these two techniques, care must be taken in the selection of coding and FM frequencies to prevent cross products generated during signal processing from containing spurious signals falling within the Doppler filter band. Under the above constraints, the optimum system parameters are summarized below.

$$f_m = \frac{1}{2\tau_{max}} = \frac{c}{4R_{max}} \quad \text{(c = speed of light)}$$

$$B = 0.9$$

$$T = 2\frac{\Delta R}{c} \quad (\Delta R = \text{range resolution})$$

$$\text{no. of code bits} = 2^N - 1 \geq \frac{R_{max}}{\Delta R} \quad (N = \text{no. of shift register stages})$$

The bandwidth limitations inherent in the system disclosed in FIG. 1 serve to decrease the effective code bandwidth. This results in a broadening of the correlation peak of the system output, and a reduction of signal detectability. To evaluate this effect, consider the received signal passed through a band limiting device $H(\omega)$ and then correlated with the reference code $u(t)$. The band limited output of the filter $H(\omega)$ will be designated as $u_L(t)$. Thus:

$$u_L(t) = F^{-1}[u(\omega)H(\omega)] \quad (11)$$

Correlating $u_L(t)$ with the reference code $u(t)$ is identical to convolving with $u(-t)$. Thus the correlator output, which is the function of interest, is expressible as below:

$$R_{uuL}(\tau) = u_L(t) * u(-t) \quad (12)$$

Transforming:

$$R_{uuL}(\tau) = F^{-1}[u_L(\omega)u(\omega)] \quad (13)$$

but:

$$u_L(\omega) = u(\omega)H(\omega) \quad (14)$$

thus:

$$R_{uuL}(\tau) = F^{-1}[H(\omega)|u(\omega)|^2] \quad (15)$$

$$R_{uuL}(\tau) = F^{-1}[H(\omega)] * F^{-1}[|u(\omega)|^2] \quad (16)$$

The term $[F^{-1}[|u(\omega)|^2]]$ is the inverse transform of the code power spectrum, which is simply the autocorrelation function $R_u(\tau)$ of a perfect code. Therefore, $$R_{uuL}(\tau) = h(\tau) * R_u(\tau) \quad (17)$$

The above result indicates that the cross-correlation function of the band limited code and the reference code is simply the convolution of the impulse of the filter with the ideal autocorrelation function.

The filter function assumed for purposes of analysis is the well-known Gaussian form $H(\omega) = e^{-0.35(\omega/\omega_c)^2}$, where $\omega_c$ is the 3 db cutoff frequency. Using this function and the ideal correlation function described, the following expression for $R_{uuL}(\tau)$ is calculated:

$$R_{uuL}(\tau) = \left[ \frac{b+1}{2} \text{erf}[5.3(b+1)R] + \frac{b-1}{2} \text{erf}[5.3(b-1)R] \right.$$

$$\left. -b\text{erf}[5.3bR] + \frac{e^{-(5.3)^2 b^2 R^2}}{\sqrt{5.3} R} [e^{-(5.3)^2 R^2} \cosh(2(5.3)^2 R^2 b) - 1] \right] R_u(\tau) \quad (18)$$

where:
$$b = \tau/\Delta T$$

$$R = f_c \Delta T$$

$$\Delta T = \text{code bit width}$$

$$f_c = 3 \text{ db cutoff freq of Gaussian filter}$$

Figure 5:
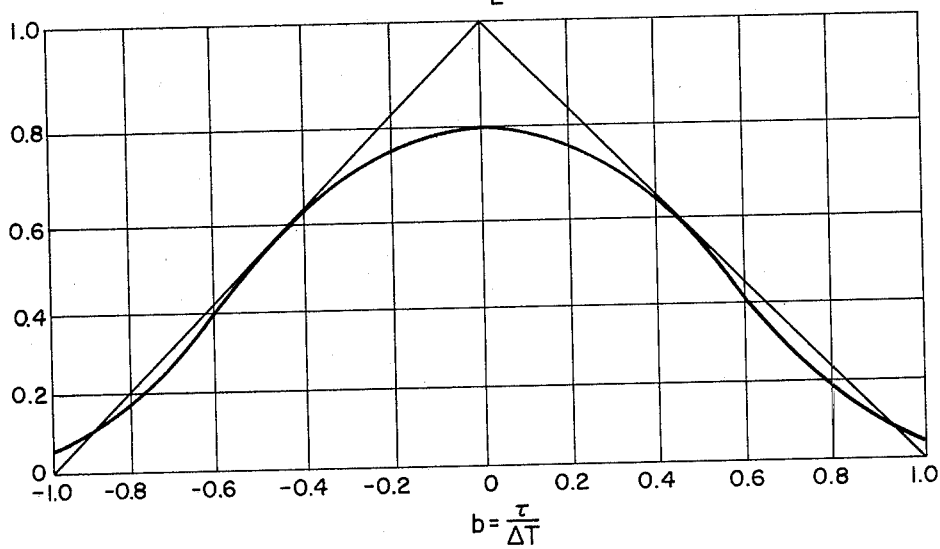
FIG. 5 is a graph showing the effect of Gaussian bandwidth on correlation peak.
Figure 4:
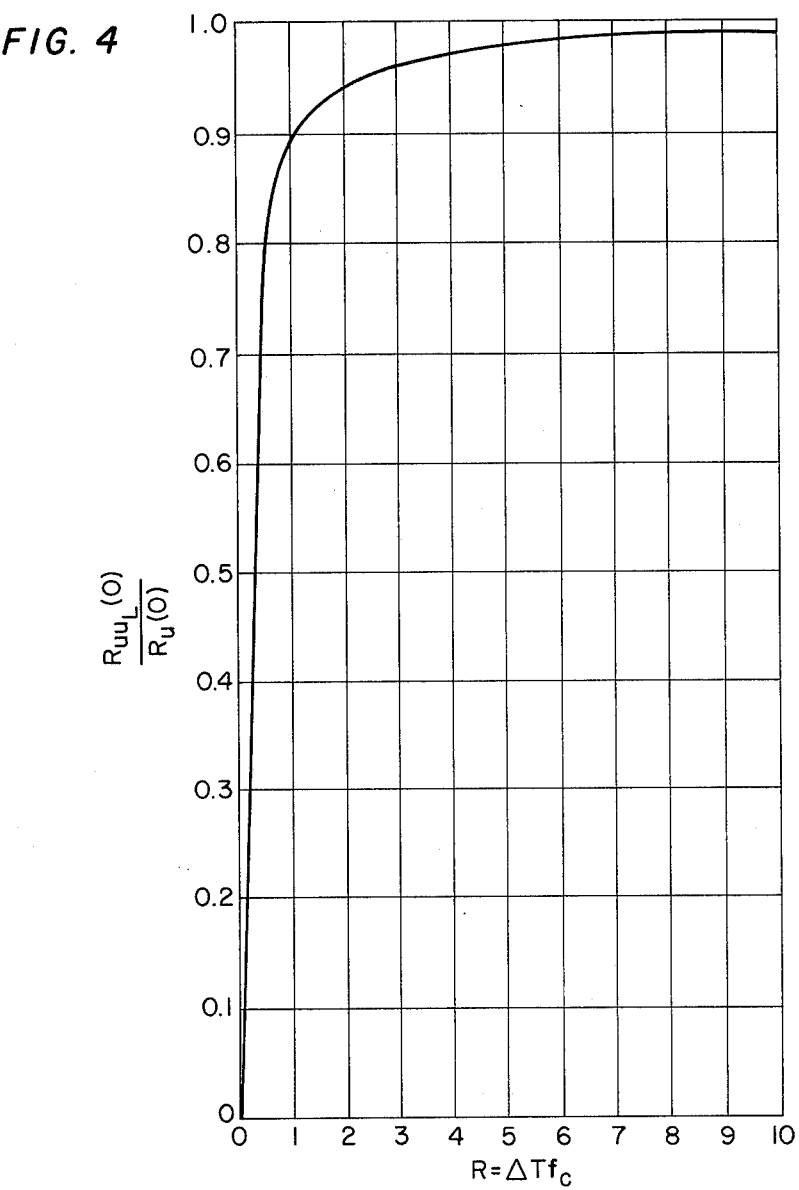
FIG. 4 is a graph showing the effect of a Gaussian filter on the correlation function.

By setting $b = 0$ in the above expression and dividing through by $R_u(O)$ the degradation in the peak of the correlation function $R_{uuL}(O)/R_u(O)$ is obtained and is plotted in FIG. 4 against $\Delta Tf_c$. Reference to this plot shows that at $\Delta Tf_c = \frac{1}{2}$, a loss of approximately 2 db is experienced in the correlation peak. Increasing the bandwidth by a factor of 3 will only retrieve 1.3 db of the loss. In FIG. 5, the resultant correlation function for the case of $\Delta Tf_c = \frac{1}{2}$ is plotted together with the ideal correlation function. It can be seen that the width of the band-limited correlation function is approximately the same as that of the ideal. Thus, there is little resolution degradation. In addition to this effect, certain range bins will have an increase in target residue. This is a more serious problem, for further bandwidth reduction will increase these residues and give false target indications.

Figure 6:
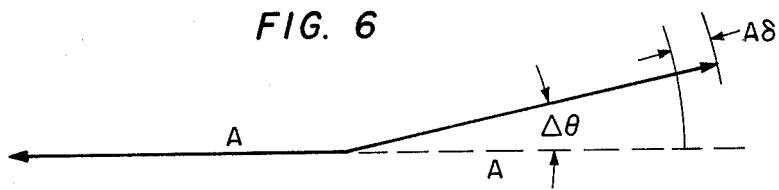
FIG. 6 is a vector diagram showing the effect of imperfect phase encoding.

While the desired phase modulation of the transmitted signal is 180° phase reversal, this is impossible to achieve in practice. There will always be a certain error $\Delta\theta$ in the phase reversing and a certain percentage of residual AM, $\delta$. This situation is depicted in FIG. 6. Such a distorted signal may be expressed as the sum of an ideal phase reversal signal and a CW component, as shown below:

$$v(t) = A[u(t)\cos\omega_o t + k\cos(\omega_o t + \theta)] \quad (19)$$

where:

$u(t) = $ ideal code (1 or $-1$)

$k \approx \frac{1}{2}\sqrt{\delta^2 + \Delta\theta^2} = \%$ distortion $\theta = $ a phase angle dependent on $\delta$ and $\Delta\theta$ The presence of the CW component in the transmitted signal, and thus also in the reference signal to the mixer 16, causes the generation of false targets at the signal processing output. It can be shown that for a distorted transmission as described, the signal at the output of mixer 16 for a target echo of delay time $\tau$ is as below.

$$v(t) = k\, u(t)u(t - \tau)\cos\phi(t) + ku(t = \tau)\cos(\phi(t) - \theta) + ku(t)\cos(\phi(t) + \theta) + k^2\cos\phi(t) \quad (20)$$

In the above expression, the modulation terms due to the sinusoidal frequency modulation have been omitted, since they have no bearing on the effect to be demonstrated. The first term is the desired signal and will properly correlate in the $\tau$ range bin. The third term will not correlate in any bin, since there is no bin reference code $u(t)$. The fourth term will correlate in the zero range bin, which is not serious, since this bin is not extensively used in practice. The second term, however, will correlate in some other range bin $\tau_f$ where $u(t - \tau_f) = u(t)u(t - \tau)$. This correlation in range bin $\tau_f$ represents a false target generated within the signal processor. The magnitude of the false target, with respect to the true indication, is just $k$, the % distortion. If such a false response is to be kept 30 db below the true response (the approximate requirements of an actual system), then $k$ must not exceed 0.032. This dictates that $\delta^2 + \Delta\theta^2 \leq 0.004$. Assuming for simplicity that the phase error and % AM are equal we have $\delta \leq 4.5\%$ and $\Delta\theta \leq 2.5°$. Thus, it is essential that the transmitter phase encoding be precise in order that false target generation be suppressed. In the instant invention, this degree of precision is, in fact, achieved since false targets do not, in general, exceed a level which is 30 db below the true target response.

Figure 7:
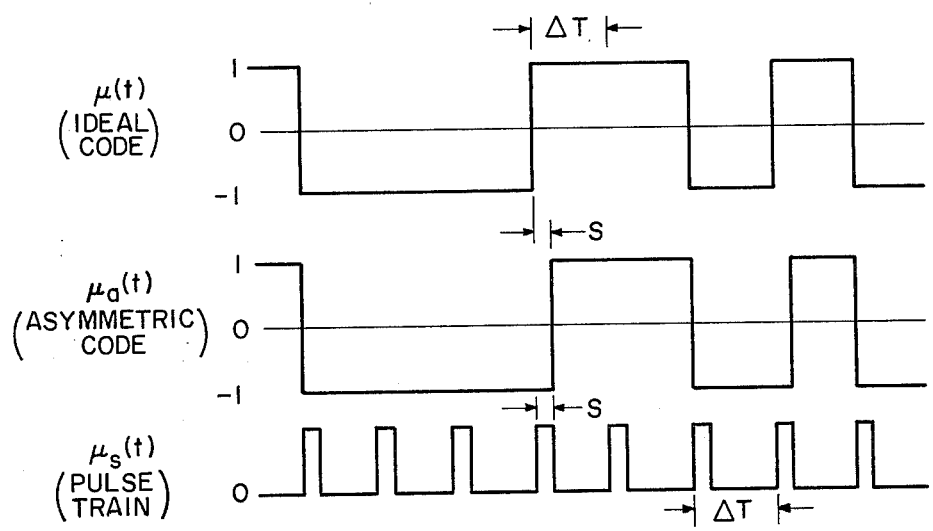
FIG. 7 is a graph comparing an ideal pseudo-random code with an asymmetric code.

Thus far, it has been assumed that the code is a perfect pseudo-random sequence of constant bitwidth. In practice, however, the code includes some small asymmetries at points where the state changes. This may be attributed to either the reference code shift register or the delay shift register in digital subsystem 13 or to unavoidable switching times in the encoding or decoding process. In FIG. 7, such an asymmetry is depicted for a simple seven bit code. This distorted code can be shown to be the sum of an ideal code and a "sliver" code and is expressed below. The "sliver" code is a pulse train $u_s(t)$ as shown in FIG. 7, modulated by the code terms in brackets. The code $u(t - \Delta T)$ is just the perfect code delayed by one bit width while the code $u(t - \delta)$ is known as the differential code and is equal to $u(t)u(t - \Delta T)$.

The effect of this distorted code on system performance can best be depicted by determining the cross-correlation function of $u_a(t)$ and $u(t)$.

$$R_{uu_a}(\tau) = \overline{u(t)u_a(t - \tau)} \quad (21)$$

$$= \overline{u(t)u(t + \tau)} - \overline{\tfrac{1}{2}u_s(t + \tau)[u(t) + u(t)u(t + \tau) - u(t)u(t - \Delta T + \tau) + u(t)u(t - \delta + \tau)]} \quad (22)$$

This reduces to the following:

$$R_{uu_a}(\tau) = R_u(\tau) - K[1/N + R_u(\tau) - R_u(\tau - \Delta T) + R_u(\tau - \delta)] \quad (23)$$

$$= (1 - K)R_u(\tau) - K/N + K R_u(\tau - \Delta T) - K R_u(\tau - \delta) \quad (24)$$

where:

$$K = \tfrac{1}{2} S/\Delta T = \tfrac{1}{2} (\% \text{ asymmetry})$$

Figure 8:
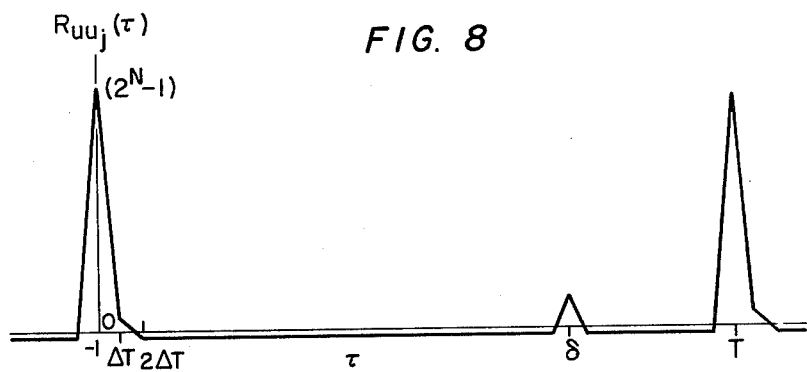
FIG. 8 is a graph showing the cross correlation function of an ideal and an asymmetric code.

This cross correlation function is shown in FIG. 8. The asymmetry is shown to cause secondary response in the correlation function in the bin adjacent to the true response and in the differential code bin. While the adjacent response simply causes a broadening or "trail off" of the major correlation peak, the peak in the differential bin could easily be interpreted as a target response in the radar system output. If such false target is to be 30 db down from the main peak, a maximum % asymmetry of 6.4% is required. While this requirement is not difficult to achieve in the digital code generation and delay systems of the radar, it can be a problem in regards to required rise times of the encoding and decoding of the analog signals.

In the radar system disclosed herein all of the above distortions are present to some degree. When they are considered simultaneously in a detailed analysis of the total signal processing, it can be shown that additional false targets are generated due to cross-modulations of the above effects. Such an analysis is too complex to be presented here. In general, if the distortion restraints are achieved in the system, then all false targets will be suppressed to the degrees indicated in the above analysis. Such suppression has been achieved in the experimental model built and tested.

FIG. 9 is a block diagram of the illustrative system shown in FIG. 1 but in considerably more detail. As shown, the transmitter signal is obtained from a reflex klystron 41 whose reflector voltage is sinusoidally varied with the output of an FM generator 42, via a line 43, to produce a frequency-modulated RF signal. In the illustrative embodiment two FM rates are used to optimize performance when operating in the zero to 5,000 meter range and the 5,000 to 10,000 meter range. For 0–5,000 meters coverage the FM rate is 15.2 KHZ and for 5,000 to 10,000 meters coverage the FM rate is 6.9 KHZ. These frequencies were chosen so that at the maximum range (in one case 5,000 meters and in the other case 10,000 meters), the processing loss due to FM suppression is a minimum. In addition, these frequencies were selected so that when they combine with the code signal, intermodulation products do not produce frequency lines which fall within the Doppler band. The amplitude of the FM signal applied to the klystron is adjusted so that the resulting index of modulation is 0.9. At this modulation index, the apparent target signal, after processing, varied by only 12 db from maximum range to minimum range, although the actual return from the target varies by 80 db.

A crystal controlled clock 44, illustratively operating at 3 MHZ, generates the basic timing for the entire system. The output of clock 44 is applied to a down-counter 36 which, in turn, is applied to FM generator 42.

After appropriate filtering of the down-counted signal, which may be accomplished within the FM generator 42 or the down counter 36, FM generator 42 produces the desired sinusoidal signal to modulate kylstron 41. An oscillator 47, illustratively operating at 30 HZ, further frequency modulates the output of klystron 41 to permit the detection of stationary targets, as previously discussed.

The frequency modulated RF signal from klystron 41 is next phase-coded by a known technique wherein the RF signal is passed through a first circulator 48 and an RF diode switch 49. The phase coding is accomplished by the RF signal reflecting from diode 49 when the diode is in a conducting state and then having the signal pass through the diode and reflect from a shorting plate, when the diode is in a non-conducting state. The diode and shorting plate are positioned such that the two reflecting RF signals are 180° out of phase with each other. The RF signal from klystron 41 which enters port 1 of circulator 48 proceeds to port 2, is reflected from diode switch 49 and emerges from port 3 phase coded by the pseudo-random code applied thereto, via a lead 51, from a code generator 52.

In the illustrative embodiment two different pseudo-random codes were used to achieve the fine and coarse range resolution capability. For fine range resolution a 255 bit, 0.33 $\mu$second bit width code was employed while for coarse range resolution a 63 bit, 1.67 $\mu$second bit width code was used. This provides 50 meter and 250 meter range resolution.

The frequency modulated, coded signal from circulator 48 is next passed through a second circulator 53 and transmitted into space via an antenna 54. Circulator 53 provides isolation between the transmit signal and receive signal to enable simultaneous transmission and reception with a single antenna.

The received signals which are attenuated, delayed, replicas of the transmitted signal, Doppler shifted and reflected by the target, are collected by antenna 54, passed through circulator 53 and into a balanced mixer 56. The reference signal for mixer 56 is the transmitter signal coupled down through a 13 db directional coupler 57. The mixer output is, therefor, the received signal multiplied by the transmitter signal; a complex signal having major spectral components from 5 KHZ to 3 MHZ. As previously discussed, the mixing process causes a scrambling of the target code delays and also produces a varying index of modulation of the FM portion of the received signal, as a function of target range. The target code delays are later unscrambled in the digital processing to obtain proper range information. The varying FM index is subsequently taken advantage of in the FM processing to reduce the dynamic range requirements of the display subsystem. The output signal from mixer 56 is amplified in a low-noise broadband video amplifier 58. This is designed with a flat frequency response to 20 MHZ and a gain of 46 db with a peak-to-peak output signal swing capability of approximately 5V. Referenced to the minimum detectable signal, the amplifier 58 has a linear dynamic range of 100 db. This dynamic range capability is maintained in the system until FM processing takes place. This allows the system to handle a maximum target of 1,000 square meters of 100 meters range. This dynamic range is necessary because the output of amplifier 58 simultaneously contains target information from all targets within the radar beam. In the illustrative embodiment this target information is unscrambled and quantized into 20 contiguous range bins by 20 range correlators $61_1$–$61_{20}$, only four of which are shown in the drawing to avoid clutter.

The digital processing subsystem, shown previously as element 13 in FIG. 1, provides the basic timing and modulation signal generation for the system. These signals are all derived from the crystal controlled 3 MHZ clock 44. All circuits in the digital subsystem are advantageously realized in integrated circuits. The functions performed in the digital subsystem are as follows:

1. Generate either of two pseudo-random codes which yield the fine and coarse range resolutions;

2. Provide 20 sets of delayed pseudo-random codes to the range correlators $61_1$–$61_{20}$ to decode range;

3. Generate start triggers and sample pulse for the visual display;

4. Generate a delay pulse to control the starting phase of the delay codes for range decoding; and 5. Perform the necessary frequency division for generating the FM signals.

The pseudo-random code is generated by code generator 52 which in the illustrative embodiment comprises an 8-stage shift register and a feedback code generation network. In the coarse resolution mode, the range resolution is 250 meters, corresponding to a clock rate of 600 KHZ; for the coarse mode, switch 37 is in the lower position shown in FIG. 9 and the clock rate of 3 MHZ is counted down by a ratio of five in down counter 46. In the fine resolution mode, the range resolution is 50 meters, requiring a clock rate of 3 MHZ; in this mode, the switch 37 is in the upper position shown in FIG. 9. To achieve a frequency repetition rate $f_r$ of the pseudo-random code of somewhat in excess of 10 KHZ, two different length codes are needed. The selected code length is determined by a switchable feedback network located within the code generator 52. For example, a mechanical switch within the code generator 52 could alter the feedback path within the code generator, in a well-known manner. This feedback network can realize a driving function of either $x^8 + x^7 + x^6 + x + 1$ for the $2^8 - 1 = 255$ bit code, or $x^6 + x + 1$ for the $2^6 - 1 = 63$ bit code. When used in the fine resolution mode, the 255 bit code is generated at a clock rate of 3 MHZ. In the coarse resolution mode, the 63 bit code is generated at a clock rate of 600 KHZ. When generating the 63 bit code, only six of the eight stages are required for code generation. The additional two stages provide additional delay codes.

In FIG. 9, two identical code generators are employed. One code generator, the transmitter code generator 52, provides the coded waveform for the transmitter. This code generator remains fixed in phase and provides the zero range timing reference for the system. The output from the first stage of transmitter code generator 52 is used to phase-code the transmitter via lead 51. This signal becomes the zero range code reference for the system.

The second code generator, delay code generator 66, is identical to transmitter code generator 52; however, its starting phase is controllable at the discretion of the operator. This is done by means including a sample register 60 and a range switch 68. The sample register is connected to the output of down-counter 46 which produces, in the illustrative example, pulses clocked at a rate of 600 KHZ. A start pulse logic within the code generator 52 monitors the eight shift register stages and provides to the sample register 60 a start pulse on a lead 67 once every 255 bits in fine resolution or once every 63 bits in coarse resolution. The sample register 60 responds to the start pulse and to the next pulse arriving from down counter 46 to provide a pulse on output line $34_1$. Upon arrival of the next pulse from down counter 46, a pulse appears on output line $34_2$, etc. The sample register 60 thus provides 20 successive pulses, each one delayed with respect to the preceding pulse by 1/600 KHZ and appearing in time sequence on the corresponding output lines $34_1$ to $34_{20}$. The range switch 68 selects one of these pulses from sample register 60 to provide the proper starting phase for delay code generator 66. The number of lines 34 need not be the same as the number of range correlators; for convenience, however, the sample register outputs can be used also to gate the rectified outputs of the range correlators for visual presentation. The operator may select one of these pulses from sample register 60 to control the starting phase of delay code generator 66. The delay of the selected pulse from counter 46, with respect to the start pulse on lead 67, becomes the actual delay time of delay code generator 66 with respect to transmitter code generator 52. When changing from the one resolution mode to the other resolution mode, the delay code generator 66 is altered in the same manner as described in connection with code generator 52.

The last stage of the delay code generator 66 is fed into a 12 stage delay register 69 which provides 12 more delay codes for range decoding.

When in the coarse resolution mode and searching targets between 0 and 5,000 meters, transmit code generator 52 and delay code generator 66 are exactly in phase. The input code to the first stage of delay code generator 66 matches exactly the transmitter zero range code reference. The output from the first stage of delay code generator 66 is the same code delayed by one bit (1.67 $\mu$ sec), and so on, with the output of the 20th stage (the 12th stage of delay shift register 69) being the same code delayed by 20 bits (1.67 $\mu$ sec times 20). When in coarse resolution mode and searching 5,000 to 10,000 meters, the operator selects the 20th range pulse and synchronizes delay code generator 66 so that the 1st stage code is 1.67 × 20 μ sec delayed from transmitter code generator 52. Therefore, the delay code generator and delay registers have 20 delay codes capable of decoding 20 range bins from 5,000 to 10,000 meters. When in the fine resolution mode the code generators are clocked at 3 MHZ; however, the 20 range pulses which are still 1.67 μ sec apart are available to control the delay of the delay code generator. The operator selects one of these range pulses and, thus, makes available for range decoding 20 fine resolution delay codes. These 20 adjacent codes are each 0.33 μ sec delayed from each other and provide a total range coverage of 1,000 meters. This 1,000 meter "window" is movable in 250 meter steps and can cover any segment from 0 to 10,000 meters.

The output delay codes from delay code generator 66 and register 69 cannot be used directly for range decoding. As was previously mentioned, the target information in the system has been scrambled because of the zero range multiplication that takes place in mixer 56. Therefore, to provide the proper delay code for range decoding, each code output from delay code generator 66 and delay register 69 is multiplied in a multiplier $71_1$–$71_{20}$ by the zero range reference code from the first stage of transmitter code generator 52 via load 51. This new set of delay codes from the twenty multipliers 71, when applied to range correlators 61 now unscrambles the target information so that the outputs of the range correlator are in proper range sequence. Code multiplication is done within multiplier 71 by an "exclusive or" circuit made up of 3, 2-input gates.

It should be noted that selection of resolution modes and range segments is advantageously performed by the operator with selector switches on a control panel instead of by electromechanic switching means. Command voltages on these selector switches automatically program the digital subsystem to give the proper code sequence, FM frequency selection, and code delays. In addition, the display subsystem responds automatically to correspond to the various operating modes.

As previously explained with reference to FIG. 1, decoding takes place in range correlators $61_1$–$61_{20}$ which quantize the target information into 20 adjacent range bins. This is accomplished by feeding each correlator with the received signal from mixer 56 after amplification in an amplifier 58 and its appropriate multiplier signal from a multiplier 71. Each range correlator is essentially a broadband balanced demodulator. In the range correlators, where the received signal is matched with the multiplier code, the output will be the FM signal and Doppler information for the target at a range corresponding to the delay of the code into the multiplier. In the correlators where the codes do not match the effective received signal is reduced. by 1/p (in the ideal case) where p is the number of bits in the pseudo-random code. The outputs of the 20 range correlators are fed to 20 identical FM processing circuits. Each FM processing circuit comprises an FM amplifier filter 73 including 2 narrow-band gain stages tuned to the FM frequency followed by a balanced, phase-sensitive demodulator 74 whose reference signal is the same signal used to modulate klystron 41, however shifted by (90° + φ) in a delay circuit 76. The output of the FM processing circuits is the Doppler signal of targets in correlated range bins. The choice of the FM frequency and the bandwidth of the FM filters is such that only the $J_1$ component of the target is allowed to pass to the demodulator. In the demodulator, the phase of the FM reference signal is adjusted by delay element 76 so that close-in targets are suppressed. The net result of this is that the dynamic range of subsequent processing and display circuits is greatly reduced. Where a dynamic range of 100 db has to be carried through the range correlators, FM filtering reduces the requirement by approximately 40 db and the phase demodulator 74 provides another 36 db of reduction in dynamic range. Therefore, the net requirements for dynamic range are reduced to 24 db. The FM amplifier in filter 73 is designed with 30 db of gain and 1.8 KHZ bandwidth centered at 15.2 KHZ for 0 to 5,000 meters coverage, 6.9 KHZ for 5,000 to 10,000 meter coverage. In the illustrative embodiment the center frequency of all 20 channels is controlled by applying a dc bias to a transistor switch in each channel, which switches in an appropriate tuning inductor. The phase characteristics of all 20 tuned circuits are matched and linear over twice the Doppler bandwidth. This insures good target signal suppression as a function of target range.

The Doppler outputs from the FM demodulators are further amplified and band limited to the Doppler bandwidth in 20 identical Doppler processing circuits 81, which provides 40 db of gain. The outputs from the Doppler filters 81 are selectable by a 20 position switch 82 for aural presentation to the operator by means of an amplifier 83 and a headset 84. In addition, each Doppler filter output is rectified and integrated in a rectifier 85, then sampled in sample gates 87 and recombined on a single line by a video amplifier 86 for video presentation on a scope. Two visual displays are available, an intensity modulated B display 91 of azimuth versus range, and an A display 92 of target strength versus range. The Doppler bandwidth is restricted from 26 to 816 cps which corrresponds to target velocities of 1 to 30 mph. The integrator time constant is made approximately 0.1 sec which corresponds to the dwell time of the radar beam when the antenna is scanning at its maximum scan rate.

In use, the radar operates primarily in its scanning mode with the range resolution in coarse. This provides 5,000 meters range coverage and azimuth coverage as selected by the operator from scan angles of 15 to 120 degrees. Targets are mapped on the B scope in this mode. Azimuth data is obtained by means of an antenna servo 95 and an analog-digital converter 93; the converter output is applied via digital-analog converter 94 to the B display 91. For more accurate data on specific targets scanning is stopped, antenna 54 is pointed at the target and fine range resolution is used. An A scope 92 is also provided which displays target strength vs range. Finally, for target identification, the operator can select a particular range bin output and listen to the Doppler with headset 84. Two auxiliary operating modes are available, these are the "All" range mode and fixed target mode. In the "All" range mode coding is discontinued and the radar functions as an FM-CW system with no range discrimination capability. Moving target returns of all targets in the radar beam are then audible in the headset, thus giving an instantaneous alerting capability to the operator of the intrusion of targets within the radar beam. In the fixed target mode all circuits in the system function normally, however, an additional frequency modulation of 30 cps at an index of 2,000 is added to the transmitter signal by oscillator 47.

This modulation causes all target returns, both fixed and moving, to produce spectral components within the Doppler bandwidth. Thus, signals from correlated targets will pass through the Doppler processing, be rectified, integrated and presented on the visual displays. Large fixed targets and ground clutter returns can thus be displayed.

The major operating parameters of the illustrative system actually built and tested are given below.

Table

| Major System Operating Parameters. | |
|---|---|
| Parameter | Value |
| Power Output | 50 milliwatts c.w. |
| Frequency | 9000 mc, tunable ±75 mc |
| Antenna Gain | 34.5 db (20 db sidelobes) |
| Receiver N.F. | 14 db |
| Number of Range Channels | 20 |
| Coarse Code | 63 bits long; 250 meters/bit |
| Fine Code | 255 bits long; 50 meters/bit |
| Frequency Modulation Characteristics | |
| Coarse Resolution Mode | |
| 0–5000 meters | 15.2 kc (0.9 index) |
| 5–10,000 meters | 6.9 kc (0.9 index) |
| Fine Resolution Mode | |
| 0–5000 meters | 15.2 kc (0.9 index) |
| 5–10,000 meters | 6.9 kc (0.9 index) |
| All Range Mode | |
| 0–5000 meters | 15.2 kc (0.9 index) |
| 5–10,000 meters | 6.9 kc (0.9 index) |
| Fixed Target Mode | 30 cps (2000 index) |
| Doppler Bandwidth | 26 to 816 cps |
| Spacial Coverage | |

Azimuth - Remote Positioning through 360°

| Scan Angle | 15, 30, 60 or 120 degrees |
|---|---|
| Scan Rate | 2, 4, 8, or 16 degrees/sec |
| Beam Width | 2 degrees |

Elevation - Remote Positioning through ± 400 mils

| Beam Width | 3.8 degrees |
|---|---|

Figure 10:
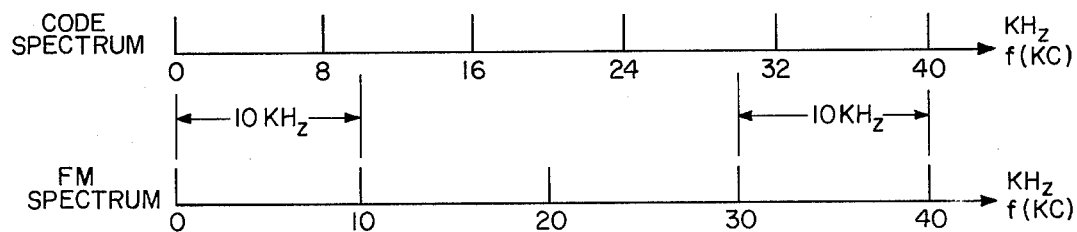
FIG. 10 is a diagram showing the relationship between certain signal harmonics in the illustrative embodiment.

The code frequencies and the FM frequency generate beat frequencies in the mixer 16 due to the intentional nonlinearities therein. The unwanted beat frequencies have to be kept at a low level so that they will not disturb the target return signal out of the Doppler filter. This can be done by careful choice of both the FM frequency $f_1$ and code repetition frequency $f_r$ combined with filtering, for example, in the Doppler filter. To achieve the best results with a minimum of filtering, both the code spectrum and the FM spectrum should be a set of different harmonics of a common basic frequency $\Delta f = f_1 - f_r$. For example, FIG. 10 depicts the situation where the spectrum of the code signal comprises the 4th, 8th, 12th harmonic of $\Delta f = 2$ KHZ fundamental while the spectrum of the FM signal $f_1$ comprises the 5th, 10th, 15th... harmonic of the same $\Delta f = 2$ KHZ fundamental. Beat frequencies generated by the mixer can only be 0, 2, 4, 6, 8...KHZ. Thus, if the Doppler filter 28 removes all frequencies including 2 KHZ and above, the unwanted beat frequencies are eliminated.

If in addition, frequencies generated in any components associated with the power supply 96 or other associated equipment, for example, an A/D converter or digital clock, are $\Delta f = 2$ KHZ or integral multipliers thereof, the Doppler filter will take care of any spurious responses coming from these sources. This means that the system can be built less expensively and lighter because additional filtering and screening may be eliminated.

One skilled in the art can make various changes and modifications to the arrangement of parts shown, without departing from the spirit and scope of the invention.

What is claimed is:

1. A radar system comprising:
   a signal transmitter source of continuous wave electromagnetic energy of a single frequency;
   means for generating a sinusoidal signal for frequency modulating said source;
   code means for generating a p-bit pseudo-random binary code; and
   means for phase-modulating said frequency modulated source with said pseudo-random code.

2. A radar system comprising:
   antenna means;
   a signal transmitter source of continuous wave electromagnetic energy coupled to said antenna means;
   means for generating a sinusoidal signal of a first frequency $f_1$ for frequency modulating said source;
   code means for generating a p-bit pseudo-random binary code of repetition frequency $f_r$ which remains fixed in phase and provides a zero range timing reference for the radar system;
   means for phase-modulating said source with said pseudo-random code;
   a receiver including means coupled to said antenna means and to said source for deriving from each target echo received by said antenna means and delayed by the round trip time and frequency translated by the Doppler shift $f_d$ owing to target motion relative to said antenna means a video frequency signal comprising the target doppler signal $f_d$ modulated upon a coded signal of frequency $f_1$;
   reference code producing means for providing $n$ distinct reference codes which are replicas of said p-bit code but delayed in time with respect thereto by $n$ different amounts representing $n$ corresponding range slots; and
   $n$ correlation means for each of said $n$ range slots coupled to said video frequency signal deriving means and receptive of a corresponding one of said reference codes for correlating said video frequency signals with said reference code,
   each of said $n$ correlation means including phase sensitive demodulator means for extracting for each target within a given range slot the target doppler signal $f_d$ from said video frequency signal.

3. A radar system according to claim 2 further comprising range switching means connected in circuit with selectable ones of said $n$ correlation means for monitoring target doppler signals associated with targets within the corresponding range slot.

4. A radar system according to claim 3 further comprising means for rendering said target doppler signals audible to an operator.

5. A radar system according to Claim 2 wherein each of said correlation means include doppler filter means wherein the difference frequencies $N /f_1 - f_r/$ generated within the receiver with $N$ being any positive integer are at least twice the largest doppler frequency $f_d$ unattenuated by the doppler filters.

6. A radar system according to claim 5 further comprising $n$ filter means each responsive to a corresponding correlation means for suppressing from the output of that correlation means all frequencies other than a band of frequencies lying between $f_1 - f_d$ and $f_1 + f_d$.

7. A radar system according to claim 5 further comprising means for supplying dc power to the components of said system and including ac sources for supplying only $/f_1 - f_r/$ harmonics thereof.

8. A radar system according to claim 2 wherein said receiver means for deriving a video signal includes mixer means for multiplying the transmitted signal and the received target echo, each of said reference code producing means including a delay code generator and means for multiplying the generated delay code by said binary code.

9. A radar system according to claim 8 further comprising adjustable phase shifting means coupled between said means for generating and said demodulator means for adjusting the phase of the transmitted frequency modulation signal to attenuate the output of said demodulator means for close-in targets.

10. A radar system according to claim 2 further comprising adjustable phase shifting means coupled between said means for generating and said demodulator means for adjusting the phase of the transmitted frequency modulation signal to attenuate the output of said demodulator means for close-in targets.

11. A radar system according to claim 2 further comprising $n$ filter means each responsive to a corresponding correlation means for suppressing from the output of that correlation means all frequencies other than a band of frequencies lying between $f_1 - f_d$ and $f_1 + f_d$.

12. A radar system according to claim 2 further comprising variable clock means connected to said code means for selectively altering the value of $p$ and the duration of each pulse in said binary code to alter the system resolution.

13. A radar system according to claim 2 further comprising a generator of sinusoidal signal energy of frequency $f_2$ and means for frequency modulating said source with said frequency $f_2$ in addition to said modulation of the source with said frequency $f_1$ whereby fixed stationary targets can be detected.

14. A radar system according to claim 2 wherein said means for phase modulating said source comprises a microwave circulator having an input port and an output port interposed between said source and said antenna means, a diode switch disposed in said input port and connected to the output of said code means whereby said diode switch is switched from a conducting to a non-conducting state in accordance with the polarity of the bits in said binary code to alter selectively the phase of the signal emerging from said circular output port by $\pi/2$ radians.

* * * * *